United States Patent [19]

Svec

[11] 3,852,900

[45] Dec. 10, 1974

[54] DISC TYPE INDICIA RECORDING AND DISPLAY DEVICE

[76] Inventor: Joseph J. Svec, Box 206, Rome, Ohio 44085

[22] Filed: July 18, 1973

[21] Appl. No.: 380,331

[52] U.S. Cl. .................. 40/70 R, 116/133

[51] Int. Cl. .................. G09f 11/04

[58] Field of Search .......... 40/70 R; 116/133; 35/74

[56] References Cited

UNITED STATES PATENTS

| | | | |
|---|---|---|---|
| 763,940 | 6/1904 | Brownell | 40/70 R |
| 857,662 | 6/1907 | Odor | 40/70 R |
| 1,311,682 | 7/1919 | Drew | 35/74 |
| 1,412,043 | 4/1922 | Crawford | 35/74 |
| 1,918,631 | 7/1933 | Burnham, Jr. | 40/70 R |
| 2,748,513 | 6/1956 | Sulger | 40/70 R |
| 3,692,238 | 9/1972 | Boyd | 35/40 X |

FOREIGN PATENTS OR APPLICATIONS

| | | | |
|---|---|---|---|
| 963,941 | 10/1965 | France | 116/133 |

*Primary Examiner*—J. H. Wolff

[57] ABSTRACT

A pocket sized device for recording information such as names and telephone numbers. The device has a cover member which supports a rotational disc member, and overlies the faces of the disc. Windows are cut in the cover member to allow access of a pencil point to write on the face of the disc. The cover member is provided with an annular ridge around the outer edge of each side to maintain the central portion of the opposite faces of the disc spaced from the cover member. The disc can be rotated to display different sets of names and numbers at the windows, and the spaced configuration prevents their smearing or smudging when the disc is rotated.

5 Claims, 8 Drawing Figures

PATENTED DEC 10 1974 3,852,900

DISC TYPE INDICIA RECORDING AND DISPLAY DEVICE

BACKGROUND OF THE INVENTION

This invention relates generally to written indicia receiving and displaying devices, and more particularly to a pocket size disc type device adapted to have written thereon names and telephone numbers, and which device can be rotated to various positions to display different names and corresponding telephone numbers.

For people who are frequently on the move, it is convenient to have a ready, handy easily carried reference of commonly used names and telephone numbers. While most people have various types and devices which are kept adjacent their normal phones for recording frequently used telephone numbers, these devices normally do not lend themselves to easy transportation and carriability by the user and hence are of no value to the user when he is away from his normal home or business phone.

While small books or note pads are to some extent effective, nevertheless these books are not easily carriable, the names and numbers may tend to become smudged, and in most instances prove to be unsatisfactory for various reasons.

SUMMARY OF THE INVENTION

According to the present invention, a device is provided for recording information such as names and telephone numbers which includes a flat disc shape member having at least one face thereof capable of receiving pencil written indicia thereon. A cover member is provided overlying at least the one face of the disc member, and means mount the disc for rotation with respect to the cover member. The cover member has window means extending therethrough exposing a portion of the one face of the disc member to permit access of a writing implement to write on the one face. The one face of the disc member and the opposing face of the cover member are in spaced relationship at the location of the band for receiving the written indicia whereby different sets of indicia can be written and changed on the disc member and the disc member rotated to display each set at the window means, the rotation occuring without contact in the window region of the indicia to thereby prevent smearing of the written indicia.

DESCRIPTION OF THE PREFERRED EMBODIMENT

Figures 1, 2, 3, 4, 5, 6, 7, 8:
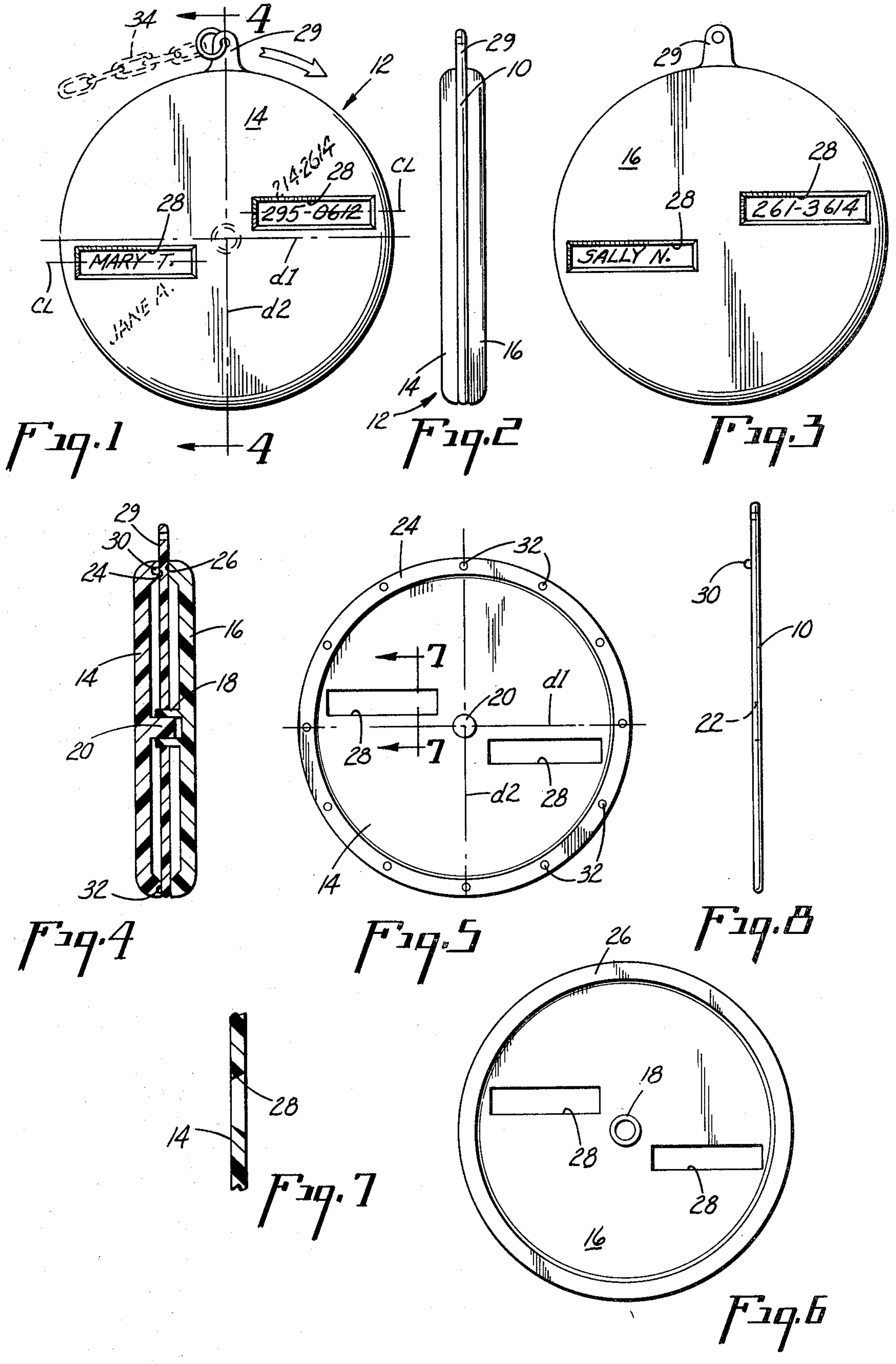
FIG. 1 is a front elevation view of the obverse side of an indicia receiving and display device according to this invention.
FIG. 2 is a side elevational view of the device of FIG. 1.
FIG. 3 is a rear elevational view of the reverse side of the device of FIG. 1.
FIG. 4 is a sectional view taken substantially along the plane designated by the line 4—4 of FIG. 1.
FIG. 5 is an inside face view looking outwardly of one section of the cver member of the device.
FIG. 6 is an inside face view looking outwardly of the other section of the cover member.
FIG. 7 is a sectional view taken substantially along the plane designated by the line 7—7 of FIG. 5.
FIG. 8 is an edge elevational view of the disc member.

Referring now to the drawing, the preferred embodiment of a device for receiving and displaying written indicia according to this invention is shown.

The device includes a generally circular flat disc member 10 and a generally circular cover member 12 formed of a front or obverse section 14 and a rear or reverse section 16. The rear section 16 is provided with a hub 18, the front section 14 is provided with a corresponding pin 20, and the disc member 10 is provided with a central aperture 22 disposed to rotatively mount the disc 10 on the hub 18. The sections 14 and 16 are assembled together with the pin 20 being inserted into the hub 18 to thereby enclose sections 14 and 16 over the disc member 10 with the disc member 10 being rotatable on the hub 18 within the cover member 12. Preferably the pin 20 is slightly tapered in such a manner so that the farther it is pushed into the hub 18 the tighter will be the fit to thereby provide an easily assembled device which will have a snug fit of the two sections 14 and 16 making up the cover member 12.

The front section 14 is provided with an outer anular ridge 24 and the rear section 16 is provided with a similar outer anular ridge 26 extending thereon. In the assembled condition, the ridges 24 and 26 are in contact with the outer marginal portions of the opposite faces of the disc 10 thereby defining a central space or band around both faces of the disc 10 which are spaced from the inner faces of the sections 14 and 16. Thus, rotation of the disc member 10 with respect to the cover member 12 will result in a sliding engagement between the faces of the disc member 10 and the ridges 24 and 26 only at the extreme outer periphery of the disc member 10 with no contact being effected in the central band or region of the opposite faces of the disc member 10.

The sections 14 and 16 are each provided with a pair of windows 28. These windows are so located that they are chordal slots, the center lines CL of which are equidistant offset with respect to the diameter *d*1 of the cover member 12 parallel to the center lines of the windows and each of which terminate short of the diameter *d*2 normal to the diameter *d*1. These windows allow the insertion of a writing implement, such as a pencil point for the purpose of writing on the faces of the disc member 10. As can be seen in FIGS. 1 and 3, a name can be written in one chordal slot and the telephone number in the opposite chordal slot. In order to permit writing on the face disc member 10, a suitable material for this disc is chosen. While there are several materials which can be utilized, it is preferred to use plastic such as "Valox," a rather grainy surfaced plastic manufactured by General Electric. This material also allows for easy erasure of pencil markings to thereby allow change of names and/or numbers. It is also preferred that the cover sections 14 and 16 be made of a plastic, for example ABS plastic which is a high impact, high strength plastic which will resist breaking.

As can be seen, the disc can be rotated to different positions to allow the writing of different corresponding names and telephone numbers, the rotation taking place with the central section of the opposite faces of the disc 10 out of contact with the corresponding faces of the cover members 14 and 16 to thereby prevent smearing on unintentional erasing of the recorded indicia. The movement of the disc is effected by grasping and turning tab 29 extending radially therefrom.

In order to provide accurately preset positions for the indicia, detenting means are provided to releaseably secure the disc 10 in a plurality of relative rotative positions with respect to the cover member 12. These detenting means take the form of a raised knob or bead 30 formed on one face of the disc member 10 in a region adjacent the annular ridge 24 on the cover section 14, and a plurality of circumferentially spaced depressions or dimples 32 on this annular ridge 24. Hence, rotation of the disc 10 with respect to the cover 12 will cause the disc to rotate and be releasably detented in a plurality of positions with the knob 30 in a given one of the depressions 32. The spacing of the depressions 32 is such that adequate space is provided between the areas immediately below the windows 28 so that the writing of one name or number in a window will not interfere with the writing of another name or number in the next rotative position as shown in FIG. 1. With the size of windows and location of the windows 28 in the preferred embodiment the depressions 32 are spaced about 30 degrees.

Also, the disc member 10 is provided with a key chain 34 attached to the tab 29. Hence, since a person normally carries his keys, he thereby insures that he has handy with him his "phone listing."

What is claimed is:

1. A device for recording information comprising, a flat disc shaped member having surface means on at least one face thereof for erasably receiving pencil-written indicia thereon, a cover member overlying at least said one face of said disc member, means mounting said disc for rotation with respect to the cover member, said cover member having window means extending therethrough and exposing a portion of said one face of the disc member to permit access of a writing implement to write on said one face of said disc member, one of said members having a raised annular rim cooperating with the other member for maintaining said cover and face in spaced relationship at the location on the face for receiving indicia, said raised annular rim further cooperating with the other member to provide detent means formed as an integral part of said cover member and said disc member to releasably secure said cover members and said disc member in any one of a plurality of relatively rotative portions, whereby different sets of indicia may be written, erased, and rewritten on said disc member, and the disc member rotated to display each set at the window means, said rotation occuring without contact in the region of the indicia to thereby prevent smearing of the written indicia.

2. The invention as defined in claim 1 wherein said detent means includes raised knob means on one of said members and cooperating depression means on the other of said members.

3. The invention as defined in claim 1 wherein said cover member includes a pair of complimentary sections, one covering each of the opposite faces of said disc, each of said sections having window means, and both of the opposite face sections of said disc being capable of receiving pencil written indicia.

4. The invention as defined in claim 3 further characterized by tab means projecting radially from said disc member beyond said cover member whereby to provide an actuating handle to rotate said disc member.

5. The invention as defined in claim 1 wherein said window means includes a pair of chordal slots, the center lines of which are equidistant off-set with respect a diameter parallel thereto and each of which terminate short of the diameter normal to said above first named diameter.

* * * * *